2 Sheets—Sheet 1.
S. S. TURNER.
Sewing Machine.
No. 363.
Reissued March 25, 1856.
Fig. 1,
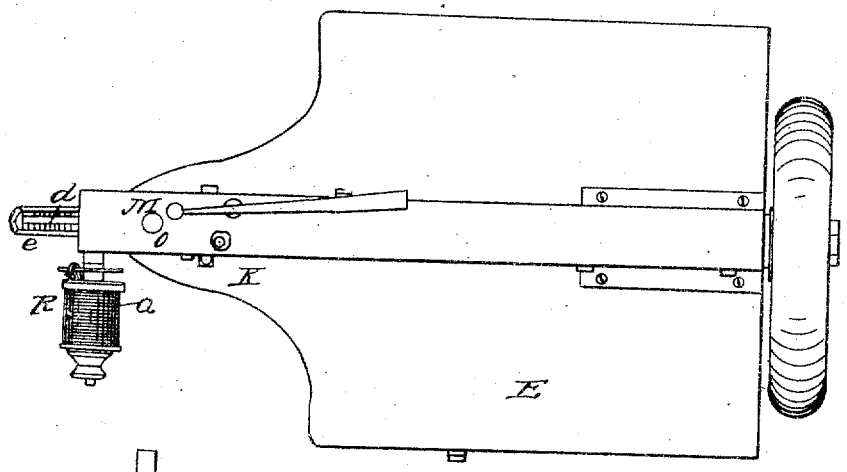
Fig. 2,
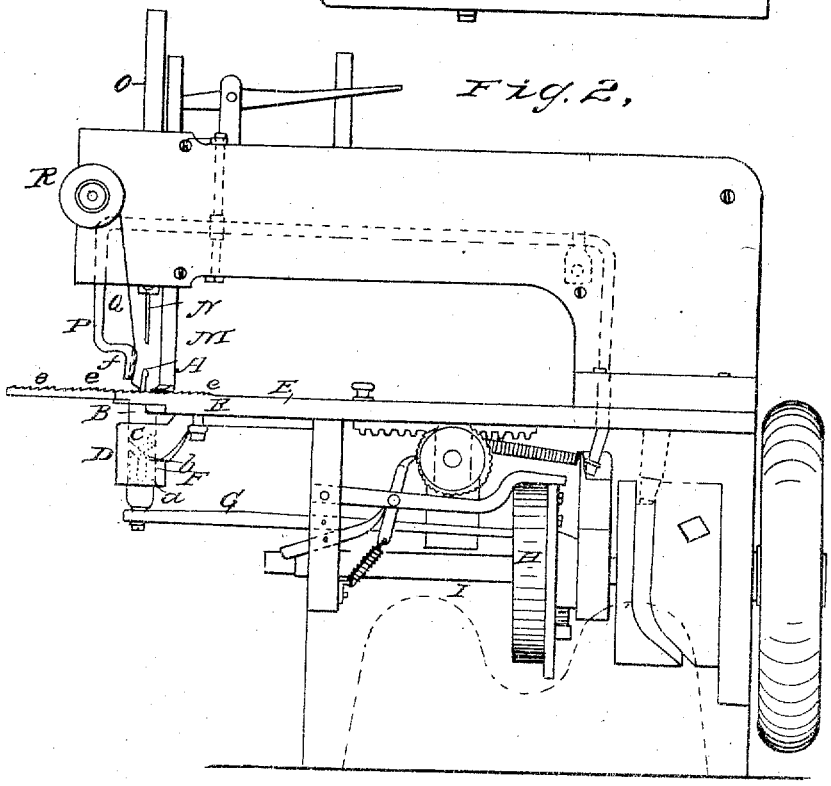

2 Sheets—Sheet 2.
S. S. TURNER.
Sewing Machine.
No. 363.
Reissued March 25, 1856.
Fig. 4,
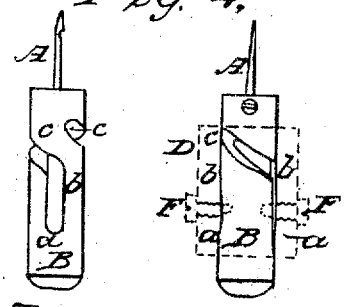
Fig. 5,
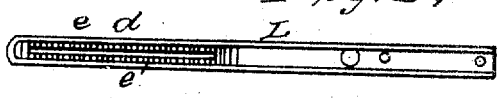
Fig. 3,
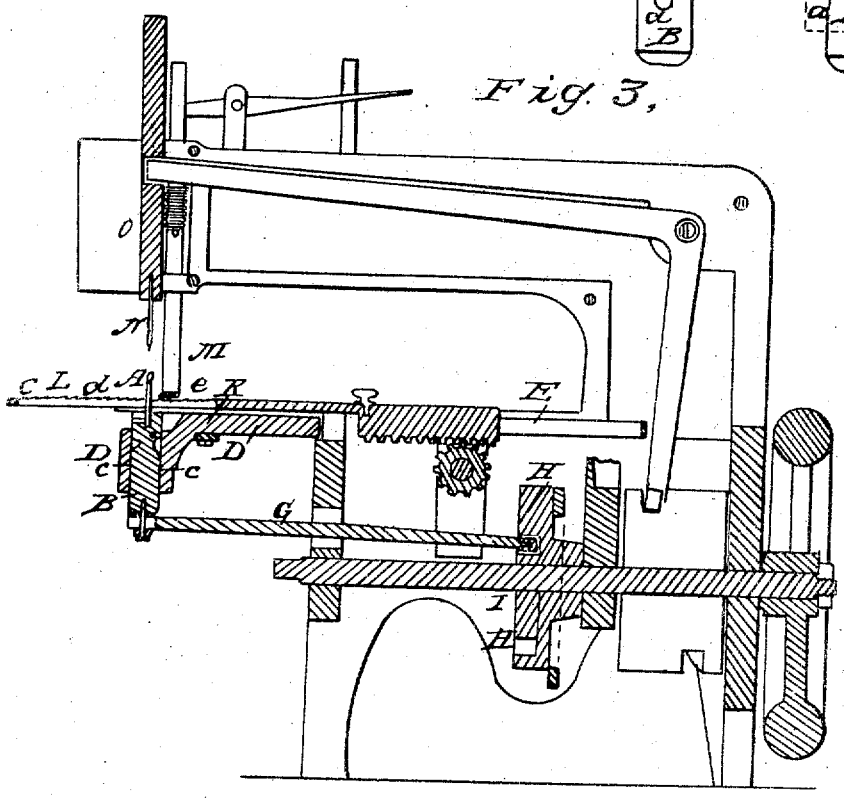

UNITED STATES PATENT OFFICE.

DNEY S. TURNER, OF WESTBOROUGH, ASSIGNOR TO ELMER TOWNSEND, OF BOSTON, MASSACHUSETTS.

IMPROVEMENT IN SEWING-MACHINES.

Specification forming part of Letters Patent No. 11,588, dated August 22, 1854; Reissue No. 363, dated March 25, 1856.

*To all whom it may concern:*

Be it known that SIDNEY STEVENS TURNER, of Westborough, in the county of Worcester and State of Massachusetts, did invent a new and useful Improvement in Machinery for Sewing Cloth, Leather, or other Material with the Chain-Stitch; and I, ELMER TOWNSEND, his assignee, do hereby declare that the same is fully described and represented in the following specification and the accompanying drawings, letters, figures, and references thereof.

Of the said drawings, Figure 1 represents a top view, and Fig. 2 a side elevation, of the said improved sewing machinery. Fig. 3 is a vertical, central, and longitudinal section of it. Fig. 4 is a side view of the needle-carrier and needle.

In Fig. 2 I have represented certain parts of the frame as broken away or removed, in order to show more clearly sundry parts of the mechanism, to be hereinafter described, and which would otherwise be hidden.

In the said drawings, A represents the hook-needle, which is a needle formed with a point and a hook in the rear of or below the point, as seen in Fig. 4. This needle is fastened in the top and in the line of the axis of a cylindric carrier, B, which plays vertically upward and downward through a cylindrical passage, C, in an adjustable arm, D, which projects from and is fastened to the under side of the table E of the machine. The carrier B is provided with a groove, *a b c*, which from *a* to *b* is made straight, while from *b* to *c* it is helical. There may be another such groove formed on the opposite side of the carrier.

There is a screw or pin, F, extended through the adjustable arm D and into the groove *a b c*, the object of such pin and groove being to produce a semi-revolution of the hook-needle immediately after it has been drawn downward through the cloth or material sewed, and it performs this particular half-rotation of the needle during the descent of the needle. During the first portion of the ascent of the needle, and before it reaches the cloth, it is rotated backward a semi-revolution, such return movement being produced by the helical part *b c* of the groove *a b c*. These peculiar movements of the needle, in connection with its vertical movements, by which it is forced through and drawn out of the cloth, enable the needle to perform the operation of sewing the chain-stitch without having any slide applied to it for closing its barb or hook, such slide, or some analogous contrivance, being generally used in the chain-stitch sewing-machine.

The peculiar object of rotating the needle during its vertical movements will be hereinafter more particularly described. Such vertical movements of the needle are directly produced by means of a lever, G, and indirectly by a grooved cam, H, which operates said lever. This method of operating the needle vertically constitutes no part of the said invention, it being understood that the front arm of the lever G is to be so applied to the needle-carrier B as to enable the latter to rotate, as above specified, during its vertical motion.

The cam H is placed upon the driving-shaft I, which is disposed under the table, as seen in the drawings. Over the adjustable arm D and the needle-carrier B, and arranged so as to move or slide freely within the top plate, K, of the table, is a feeding-bar, L, formed in top view as seen in Fig. 5. This feeding-bar is to be provided with a long slot, *d*, through which the needle passes during its passage toward and away from the cloth or material to be sewed. The upper surface of this feeding-bar L, for some distance from its front end, may be provided with teeth or indentations, as seen at *e e*, it being understood that upon them the leather or material to be sewed is to rest during the operations of the needle, it being forced or held down upon the said feeding-bar by a presser, M, arranged as seen in the drawings, such presser being constructed and made to operate in the ordinary way.

Above the needle is an awl or piercer, N, which stands vertically, and is inserted and fixed in the lower end of a carrier, O, such carrier being moved upward and downward by suitable mechanism, or such as will cause the awl to descend and puncture the material to be sewed previous to the upward passage of the needle through such material, the needle being made to pass upward through such hole made by the awl or piercer.

The thread-carrier is seen at P, it being made to receive the thread Q from a bobbin, R, arranged as seen in the drawings. The lower end of the thread-carrier is bent, as seen in Fig. 2, and has a hole or passage, *f*, made down through it, for the reception of the thread Q. This thread-carrier is to be so operated by suitable mechanism as to enable it at the proper time or times to lay or wind the thread once around the needle, or in the hook of the needle, (when the said hook stands above the cloth or material to be sewed,) and so as to enable the said needle, during its next succeeding depressions, to draw the thread down through the cloth in the form of a loop. While doing this the barb of the needle is made to stand in a direction toward the presser; but as soon as the barb has passed through the cloth, the horizontal rotation of the needle commences to take place and continues during the further descent of the needle, such needle, during such time, making a semi-revolution, or thereabout. It is during the time that the needle is below the leather or material to be sewed that such material is moved the distance necessary for the performance of the succeeding stitch, such being effected by the feeding-bar L. During such movement of the feeding-bar, if the barb of a needle were allowed to stand in a direction toward the presser, (it being understood that such movement is inward toward the table,) it will readily be seen that the loop just previously drawn down by the hook would be very likely to be pulled off the barb; but if we reverse the position of the barb, or make it stand in an opposite direction, the loop will be supported on the shank of the needle and up against the barb, whereby it will be impossible to draw it off from the needle.

Now, were we to cause the barb of the needle to always stand in a direction away from the presser (it being understood that the cloth is fed forward transversely of the presser) during the vertical movements of the needle, it will readily be seen that on the descent of the needle through the cloth it would not be likely to draw the new loop through the loop last formed and resting on the shank of the needle, for this latter loop would unquestionably be drawn into the hook, so as to prevent its being discharged from the hook. The natural consequence of such would be a breakage of the thread.

As the mechanism for operating the presser, that for operating the awl or piercer, and that for operating the thread-carrier may be varied, and as it is not intended to claim any part of the same as the invention of the said TURNER, it is not deemed necessary to go into any further description thereof.

The particular arrangement of the needle below the cloth or feeding bar L, in connection with the particular arrangement of the presser above the cloth or feeding bar, enables us to employ the machine to great advantage in the formation of sewing, as by it we are enabled to see the work on that side where the loops are drawn into it, and so as to enable us to guide the line of sewing in any proper manner against an edge when such edge is underlapped by the under layer of cloth or material to be sewed.

In order to explain more particularly, it may be stated that the machine is especially adapted to the connection of the vamp and quarter of a shoe where the quarter overlaps the vamp. Where the needle works above the table and down through the cloth, it is not conveniently adapted to the production of such work, as the finished side of the sewing, or that which is seen on the outside of the leather, would of necessity, under such circumstances, be hidden from the view of the attendant, thus rendering it exceedingly difficult for him to direct the line of sewing parallel to the edge of the underlapping piece of material.

Now, in sewing-machines operating with two needles and two threads, such threads being interlooped together, one needle must of necessity be placed on one side of the cloth or material to be sewed, while the other is placed on the other side of it. It must be borne in mind, however, that in these machines the needle is not made as a hook-needle, but has the thread carried through an eye made through it; also, that these machines do not perform the single chain-stitch sewing with a single thread.

In connection with the above it may be remarked that the peculiar arrangement and operation of the awl and needle, or the hook of the latter, in the machine of said TURNER may be said to be novel and of great importance in a chain-stitch sewing-machine, inasmuch as they not only pierce in opposite directions the leather or material to be sewed, but are withdrawn in opposite directions therefrom. This enables the hole formed by the awl to be made large enough at its bottom for the reception of the needle, and gradually expanding toward and much larger at its top, in order that it may be of a size suitable to receive the loop drawn into it by the hook of the needle. For this purpose the awl has a tapering form, or one calculated to make a hole larger at the top than at its bottom.

Sewing-machines have been constructed wherein two awls and two needles have been employed, the awls being made to pass in opposite directions through each hole, each needle only passing through the hole in one direction. These machines, however, were not for performing chain-stitch sewing, and their needles were not provided with hooks. They therefore did not perform the functions necessary to the production of chain-stitch sewing. So in regard to those chain-stitch sewing-machines wherein an awl has been used to puncture the leather or material sewed, such awl and needle were arranged on the same side of the material, the awl being made to puncture the material in direction in which the needle passed into it. In the drawings hereto annexed, the awl and needle are exhibited as disposed or arranged so as to pass in opposite directions through the said material.

What therefore I claim as the invention of the said TURNER is—

1. The arrangement of a hook or hook-needle underneath, and so as to work up through the feeding-bar L, in combination with the arrangements of the presser M above the feeding-bar, and so as to press downward toward it, substantially in the manner as above described, such enabling me to obtain an important advantage in operating by the single chain-stitch sewing-machine.

2. In a chain-stitch sewing-machine, arranging and operating the awl and the hook-needle, as described—that is, so that they may not only pierce in opposite directions the material to be sewed, but be withdrawn in opposite directions therefrom.

3. In combination with the mechanism for giving the vertical movements to the needle, the slot *a b c*, and screw or pin F, or mechanical equivalent therefor, for producing reciprocating semi-rotative movements of the needle during the vertical movement of it, substantially in manner and for the purpose as above described.

In testimony whereof I have hereunto set my signature this 20th day of November, A. D. 1855.

ELMER TOWNSEND.

Witnesses:
R. H. EDDY,
F. P. HALE, Jr.